Patented Sept. 7, 1948

2,449,006

UNITED STATES PATENT OFFICE 2,449,006

ALKENOXY AMINO DIPHENYLAMINES

Robert P. Parker, Somerville, and John J. Denton, Bound Brook, N. J., assignors to American Cyanamid Company, New York, N. Y., a corporation of Maine No Drawing. Application July 3, 1944,
Serial No. 543,434

8 Claims. (Cl. 260—571)

This invention relates to 4'-alkenyloxy-4-aminodiphenylamines.

The compounds of the present invention may be represented by the following formula:

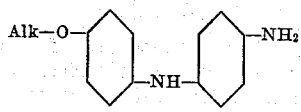

in which Alk is an alkenyl radical. Salts of the compounds with strong acids are also included.

The compounds of the present invention are useful in the production of azo dyestuffs. When diazotized and coupled, particularly with ice-color coupling companents, azo dyestuffs are obtained which exhibit superior fastness properties such as fastness to light, heat and washing and the colors retain their brightness well.

The compounds of the present invention may be prepared by reacting 4'-hydroxy-4-nitrodiphenylamine or its 2-sulfonic acid derivatives with an alkenyl ester such as an alkenyl chloride, bromide or iodide. The reaction with the alkenyl halides is preferably carried out in the presence of an acid binding agent. It is, also, preferred to effect reaction in solution for which purpose aqueous alcohols are preferred. The nature of the solvents is not critical and it is an advantage that a wide range of organic solvents are useful. Typical further examples are acetone and dioxane. Suitable acid binding agents are numerous; such as the alkali metal and alkaline earth metal carbonates, alkaline earth metal oxides, the alkali and alkaline earth metal hydroxides and the alkali-metal alkoxides. The choice of the alkenyl halide is not critical, but as the bromides and iodides do not present material advantages over the chlorides, the latter are preferred by reason of their cheapness and commercial availability.

When the initial nitro compound is prepared from 4'-hydroxy - 4 - nitrodiphenylamine-2-sulfonic acid, and it is desired to remove the sulfonic acid group, this may be effected before or after reduction of the nitro group.

It is an advantage of the present invention that the reduction of the nitro group to the amino group may be readily accomplished by either alkaline or acidic reducing agents. The pH of the reaction medium will determine whether the amino compounds are obtained in the form of the free base or as their salts. The principal value of the compounds is in the production of azo dyes and for this purpose it is immaterial whether the compound is in the form of the free base or a salt.

Typical alkenyl groups which may be present in the compounds of the present invention are the following; allyl, 2-methylallyl (methallyl), 2-chloroallyl, 2-cyanoallyl, crotyl, 3,3-dimethylallyl, and 2-fluoroallyl. The invention will be described in conjunction with the following examples which illustrate the production of representative compounds of the present invention and their use in the production of some azo dyestuffs. All parts are by weight unless otherwise noted.

Example 1

4'-allyloxy-4-aminodiphenylamine hydrochloride

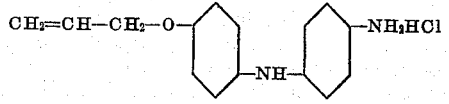

A mixture of 27 parts of 4'-allyloxy-4-nitrodiphenylamine, 125 parts 37% sodium sulfhydrate, and 79 parts of alcohol is stirred continually in a reaction vessel and heated under reflux for four hours. It is cooled and a copious precipitate of 4'-allyloxy-4-aminodiphenylamine forms when 100 parts of water is added slowly. This slurry is further diluted with 200 parts of water, and the solid is collected on a filter. After being washed free of mother liquor, the amine is isolated in the form of its hydrochloride by being dissolved in hot, dilute hydrochloric acid, the solution filtered, chilled, and the 4'-allyloxy-4-aminodiphenylamine hydrochloride salted out with sodium chloride.

Example 2

Eleven and one-tenth parts of 4'-allyloxy-4-aminodiphenylamine hydrochloride as obtained in Example 1 are slurried in 200 parts of water containing 48 parts of 17% hydrochloric acid. The slurry is kept at 15° C. while being diazotized slowly by dropwise addition of a solution of 3 parts of sodium nitrite in 44 parts of water. The resulting slurry is diluted with approximately 150 parts of water, heated to 50° C., treated with decolorizing charcoal, and filtered. The clear, red-orange solution resulting is chilled in an ice bath, and the diazonium chloride of 4'-allyloxy-4-amino diphenylamine is precipitated as an orange solid through addition of sodium chloride. It is filtered off and is dried at low temperature. It is readily soluble in water.

Example 3

A dry mixture is made from 3.3 parts of the diazonium chloride as prepared in Example 2 from 4'-allyloxy-4-amino-diphenylamine, 2 parts of magnesium sulfate dihydrate, and 1 part of anhydrous sodium sulfate.

Two parts of this dry mixture are dissolved in 25 parts of water and the solution is treated with 73 parts of suitable carbohydrate thickener. This thickened printing paste is printed from an engraved steel roll on cotton piece goods that have been previously impregnated with the anilide of 2-hydroxy-3-naphthoic acid in an alkaline grounding liquor. The printed stripe is dried at 65° C., is cleared in a hot dilute soda ash bath, is treated in ½% soap solution at 60° C., is rinsed and dried.

The pattern is printed a strong blue of greenish shade which shows superior fastness properties.

*Example 4*

4'-methallyloxy-4-nitrodiphenylamine

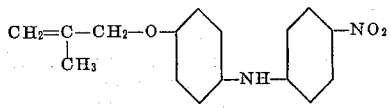

To a solution of 9.5 parts 95% sodium methylate and 34.5 parts 4'-hydroxy-4-nitrodiphenylamine in 197 parts of absolute alcohol is added 14.9 parts methallylchloride. The reaction mixture is heated under reflux for six hours. After heating it is cooled, and 150 parts of water is added to induce crystallization of the product. This cold slurry is then poured into 700 parts of water kept acidic to litmus. The solid is collected on a filter and the filtrate discarded. The damp solid is reslurried in water kept alkaline to phenolphthalein and the solid 4'-methallyloxy-4-nitrodiphenylamine is recollected on a filter, washed free of alkali and dried. After crystallization from dilute alcohol, its melting point is 80–82° C.

*Example 5*

4'-methallyloxy-4-aminodiphenylamine hydrochloride

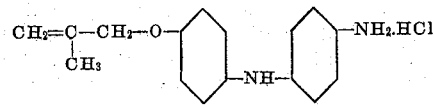

29.7 parts of 4'-methallyloxy-4-nitrodiphenylamine is suspended in 125 parts of 37% sodium sulfhydrate solution and 59 parts of ethyl alcohol and the whole refluxed with continuous agitation for a number of hours until reaction is complete. After the reaction mixture is cooled, the addition of a few parts of water causes the amine to solidify and results in a smooth slurry. This slurry is diluted with 200 parts of water, and the solid 4'-methallyloxy-4-aminodiphenylamine is collected on a filter and washed thoroughly with water containing sodium hydrosulfite. The amine is obtained in the form of its hydrochloride by dissolving in warm, very dilute hydrochloric acid, treating with decolorizing charcoal, filtering, cooling in an ice bath, and salting out with sodium chloride. The crystalline 4'-methallyloxy-4-aminodiphenylamine hydrochloride which forms is collected on a filter and dried.

*Example 6*

A mixture of 11.6 parts of 4'-methallyloxy-4-aminodiphenylamine hydrochloride (as obtained in Example 5), 150 parts of water, and 48 parts of 17% hydrochloric acid is stirred and cooled to 15° C. and kept at that temperature while being diazotized with a solution of approximately 3.3 parts sodium nitrite in 49 parts of water. After diazotization is complete, the mixture is diluted with about 300 parts of water, warmed and stirred in a water bath to 60° C., and the solution is treated with charcoal and filtered. The filtrate which is clear and bright orange in color is chilled and stirred in an ice bath, and the diazonium chloride is salted out by the addition of sodium chloride. The diazonium chloride of 4'-methallyloxy-4-aminodiphenylamine is obtained in the form of a yellow-orange solid, which is collected on a filter and dried. It is readily soluble in water.

*Example 7*

A dry mixture is prepared from 52 parts of the diazonium chloride of 4'-methallyloxy-4-aminodiphenylamine, 23.3 parts of magnesium sulfate dihydrate and 11.7 parts of anhydrous sodium sulfate.

When 2.0 parts of this mixture are converted to a printing paste and printed according to the procedure as described in Example 3 on cotton fabric previously impregnated with the anilide of 2-hydroxy-3-naphthoic acid and finished by the procedure described, a heavy blue of strong reddish shade and good fastness properties is obtained.

*Example 8*

10.2 parts of the sulfate salt of 4'-(allyloxy)-4-aminodiphenylamine are slurried in a mixture of 130 parts of water and 8.0 parts of 20% sulfuric acid. After stirring for ½ hour the temperature is adjusted to 15° C. and the slurry is diazotized by slow addition of 3.2 parts of sodium nitrite dissolved in 40 parts of water. The resulting solution is clarified and the chilled filtrate is treated dropwise with 10 parts sulfuric acid (1.84) and then 10 parts of anhydrous sodium sulfate are strewn in portionwise.

The orange, flaky precipitate of the diazonium acid sulfate of 4'-(allyloxy)-4-aminodiphenylamine is collected on the filter and is dried at low temperature.

*Example 9*

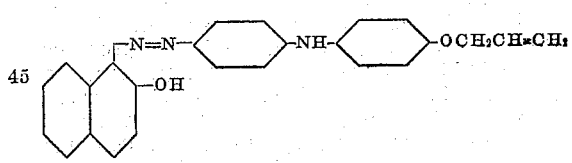

When 0.2 part of the dry diazonium acid sulfate obtained as described in Example 8, slurried in 2.5 parts methanol, is treated with a slurry of 2.0 parts of beta-naphthol in 2.5 parts of methanol and 3.0 parts of pyridine, a thick blue-black paste is obtained. This is heated for 10 minutes on a steam bath, is diluted with 200 parts of water and 20% sodium hydroxide is added until the resulting slurry is well alkaline to phenolphthalein paper. The dyestuff is flocculated by digestion on the steam bath, is filtered off, washed well with hot water, then with dilute hydrochloric acid, finally by hot water.

After drying, a deep blue pigment is obtained, insoluble in water.

*Example 10*

4.0 parts of the dry diazonium acid sulfate of 4'-(allyloxy)-4-aminodiphenylamine as obtained in Example 8 are intimately mixed with 2.2 parts magnesium sulfate dihydrate and 1.1 parts of anhydrous sodium sulfate.

This product is used to produce developed dyeings on cotton fabric by the following procedure:

Cotton fabric is treated in alkaline grounding baths comprising: 5 parts of ice color coupling component, 5 part of methanol, 20 parts of 20% sodium hydroxide solution and 470 parts of water. The treated cloth is passed between squeeze rolls and is immediately dried at 65° C.

5.0 parts of the fabric so treated is entered into dye baths containing 0.5 part of the above dry blended mixture dissolved in 250 parts of water and while the fabric is efficiently agitated 5 parts of 20% sodium acetate solution is run in.

When full color development is attained, the fabric is rinsed, is cleared at 70° C. in an alkaline solution (3% soda ash and 2% sodium hydroxide) for 2 minutes, treated at 70° C. in a ½% soap solution, rinsed in fresh water and dried.

The colors obtained with various ice color coupling components are as follows:

| Ice Color Coupling Component | Color |
|---|---|
| 2-Hydroxy-3-naphthoic acid anilide | green-blue. |
| 2-Hydroxy-3-naphthoic acid-(2'-methylanilide) | blue. |
| 2-Hydroxy-3-naphthoic acid-(2'-ethoxyanilide) | navy blue. |
| Bis-(acetoacetic)-o-tolidide | yellow-brown. |
| 2-Hydroxy-3-naphthoic acid-(4'-chloroanilide) | blue. |
| 2-Hydroxy-3-naphthoic acid-(3'-nitranilide) | green-blue. |
| 2-Hydroxy-3-anthracene carboxylic acid-(2'-methylanilide). | dark green. |
| 2-Hydroxy-3-carbazole carboxylic acid-(2'-methylanilide). | chocolate. |

*Example 11*

The dry, blended mixture of the diazonium chloride of 4'-(methallyloxy)-4-aminodiphenylamine as made in Example 7 is used to produce developed dyeings on cotton fabric previously impregnated with ice color coupling components by the procedure as described in Example 10. The colors produced are listed below:

| Ice Color Coupling Component | Color |
|---|---|
| 2-Hydroxy-3-naphthoic acid anilide | navy blue. |
| Bis-(aceto-acetic)-benzidide | dark tan. |
| 2-Hydroxy-3-naphthoic acid-(2'-methoxyanilide) | bluish black. |
| 2-Hydroxy-3-naphthoic acid-(2'-methyl-4'-chloroanilide). | reddish blue. |

*Example 12*

4'-(2''-chloroallyloxy)-4-nitrodiphenylamine

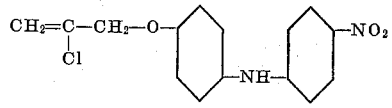

A solution of 240 parts of 95% ethanol, 6.4 parts of powdered sodium hydroxide, 34.5 parts of 4'-hydroxy-4-nitrodiphenylamine and 17.5 parts of 2-chloroallyl chloride is heated under gentle reflux for five hours. The solution is poured onto 700 parts of water, and a golden yellow solid separates out. This solid is collected on a filter and dried. The product, 4'-(2''-chloroallyloxy)-4-nitrodiphenylamine, crystallized from methyl alcohol melts at 82–84°. This product shows the phenomenon of existing in two forms, namely, a yellow form and a red form.

*Example 13*

4'-(2''-chloroallyloxy)-4-aminodiphenylamine hydrochloride

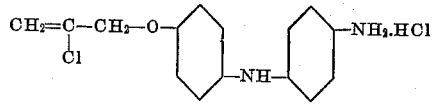

22.2 parts of iron powder, 240 parts of water, one part of glacial acetic acid and a pinch of "gardinol" are charged in the reaction vessel and the temperature is raised to 75° C. At this temperature 12.2 parts of 4'-(2''-chloroallyloxy)-4-nitrodiphenylamine are added and the mixture is warmed in a water bath at 99° C. for five hours. After cooling, the mixture is filtered and the iron sludge is extracted with 150 parts of acetone. The acetone solution is clarified by filtration with charcoal. The clear acetone solution is cooled and when water is added the free base precipitates out as an oil. This is extracted with ether, and the dihydrochloride of 4'-(2''-chloroallyloxy)-4-aminodiphenylamine is precipitated from this ether solution by the addition of dry hydrogen chloride. When purified by crystallization from dilute hydrochloric acid, the monohydrochloride salt is produced which melts at 190–191.5° C.

*Example 14*

3.5 parts of 4'-(2''-chloroallyloxy)-4-aminodiphenylamine hydrochloride are dissolved in a solution of 12 parts of 17% hydrochloric acid in 35 parts of water, and the resulting solution is quickly iced to 15° C. A solution of 0.83 part of sodium nitrite in 12 parts of water is added slowly to this solution, and the whole is stirred until the diazotization is complete. The solution is clarified by filtration at 40° C. with diatomaceous earth. The filtrate is cooled and sodium chloride is added. The diazonium chloride of 4'-(2''-chloroallyloxy)-4-aminodiphenylamine precipitates as an oily solid which after separation and drying becomes friable. It may be rapidly dried and solidified by intimately mixing it with an equivalent weight of a mixture of magnesium sulfate-sodium sulfate (two parts magnesium sulfate dihydrate to one part anhydrous sodium sulfate). The resulting blended product is readily soluble in water.

*Example 15*

One part of the blended diazonium chloride as prepared in Example 14 is dissolved in 300 parts of water and then 5.0 parts of cotton piece goods previously impregnated in an alkaline grounding bath of the ortho-phenetidide of 2-hydroxy-3-naphthoic acid are entered to the dye bath and are well stirred for 10 minutes. The goods are removed, rinsed in fresh water, cleared in boiling dilute soda ash bath, treated in ½% soap solution at 65° C., rinsed in fresh water and dried.

The cloth is evenly dyed a heavy shade of blue.

When instead of the ortho-phenetidide of 2-hydroxy-3-naphthoic acid and anilide is employed in the above dyeing operation, the cloth is dyed a strong blue of redder shade.

We claim:

1. Chemical compounds represented by the formula

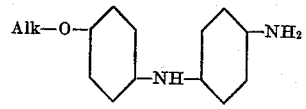

in which Alk is a radical selected from the group consisting of allyl, methallyl and beta-chloroallyl radicals.

2. The chemical compound represented by the formula:

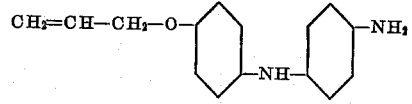

3. The chemical compound represented by the formula:

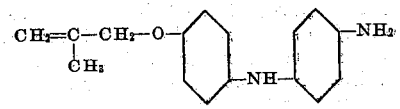

4. The chemical compound represented by the formula:

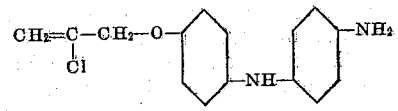

5. A salt of a compound of claim 1.
6. A salt of a compound of claim 2.
7. A salt of a compound of claim 3.
8. A salt of a compound of claim 4.

ROBERT P. PARKER.
JOHN J. DENTON.

REFERENCES CITED

The following references are of record in the file of this patent:

UNITED STATES PATENTS

| Number | Name | Date |
|---|---|---|
| 2,278,559 | Paul | Apr. 7, 1942 |
| 2,342,136 | Gibbs | Feb. 22, 1944 |

OTHER REFERENCES

Sidgewick's, "Organic Chemistry of Nitrogen" (1937) (pages 45–48).